US012110726B2

(12) United States Patent
Romero et al.

(10) Patent No.: US 12,110,726 B2
(45) Date of Patent: Oct. 8, 2024

(54) SWING DOOR OPERATOR WITH OFFSET SPRING

(71) Applicant: Overhead Door Corporation, Lewisville, TX (US)

(72) Inventors: Federico Romero, Corpus Christi, TX (US); Viorel Hodis, Corpus Christi, TX (US)

(73) Assignee: Overhead Door Corporation, Lewisville, TX (US)

( * ) Notice: Subject to any disclaimer, the term of this patent is extended or adjusted under 35 U.S.C. 154(b) by 0 days.

(21) Appl. No.: 17/887,841

(22) Filed: Aug. 15, 2022

(65) Prior Publication Data

US 2022/0389745 A1 Dec. 8, 2022

Related U.S. Application Data

(62) Division of application No. 16/752,423, filed on Jan. 24, 2020, now Pat. No. 11,414,911.

(51) Int. Cl.

| | |
|---|---|
| ***E05F 15/70*** | (2015.01) |
| ***E05F 1/10*** | (2006.01) |
| ***E05F 15/53*** | (2015.01) |
| ***E05F 15/63*** | (2015.01) |

(52) U.S. Cl.

CPC .............. *E05F 15/63* (2015.01); *E05F 1/105* (2013.01); *E05F 15/53* (2015.01); *E05F 2015/631* (2015.01); *E05Y 2900/132* (2013.01)

(58) Field of Classification Search

CPC . E05F 15/63; E05F 15/53; E05F 1/105; E05F 2015/631; E05Y 2201/10; E05Y 2201/11; E05Y 2201/492; E05Y 2600/56; E05Y 2800/70

See application file for complete search history.

(56) References Cited

U.S. PATENT DOCUMENTS

| | | | | |
|---|---|---|---|---|
| 3,864,875 | A | 2/1975 | Hewitt | |
| 4,021,968 | A * | 5/1977 | Kendall | E05F 1/1075 49/386 |
| 4,501,090 | A | 2/1985 | Yoshida et al. | |
| 5,488,896 | A | 2/1996 | Current | |
| 6,151,753 | A | 11/2000 | Salutzki | |
| 7,401,759 | B2 | 7/2008 | Alfieri | |
| 8,393,054 | B2 | 3/2013 | Bienek | |
| 10,100,568 | B2 * | 10/2018 | Scheuring | E05F 15/622 |
| 2015/0069869 | A1 * | 3/2015 | Loeffler | E05F 1/1041 310/80 |
| 2016/0002965 | A1 | 1/2016 | Janak | |

(Continued)

FOREIGN PATENT DOCUMENTS

| | | |
|---|---|---|
| CN | 106014051 A | 10/2016 |
| CN | 106703586 A | 5/2017 |

(Continued)

*Primary Examiner* — Jerry E Redman

(74) *Attorney, Agent, or Firm* — Haynes and Boone, LLP

(57) ABSTRACT

A method for replacing a spring in a swing door operator includes releasing a first end of the spring, pivoting the first end with respect to a housing about a spring mount supporting a second end of the spring, and sliding the spring away from the spring mount in a direction extending from the second end toward the first end. The housing encloses drive components of the swing door operator when in an operational configuration.

20 Claims, 10 Drawing Sheets

(56) References Cited

U.S. PATENT DOCUMENTS

| | | | | |
|---|---|---|---|---|
| 2017/0081892 | A1 | 3/2017 | Fan | |
| 2021/0230924 | A1* | 7/2021 | Romero .................. | E05F 15/63 |
| 2022/0389745 | A1* | 12/2022 | Romero .................. | E05F 1/105 |

FOREIGN PATENT DOCUMENTS

| | | | | | |
|---|---|---|---|---|---|
| CN | 111155461 | A | * | 5/2020 | |
| CN | 210938366 | U | * | 7/2020 | |
| CN | 113622776 | A | * | 11/2021 | |
| DE | 102014212351 | A1 | | 12/2015 | |
| WO | WO-2020020866 | A1 | * | 1/2020 | ........... B64C 1/1423 |

* cited by examiner

SWING DOOR OPERATOR WITH OFFSET SPRING

PRIORITY CLAIM

This application is a divisional of U.S. patent application Ser. No. 16/752,423, filed Jan. 24, 2020, titled "Swing Door Operator with Offset Spring," which is incorporated herein by reference in its entirety.

TECHNICAL FIELD

This disclosure is generally directed to an operator for a door, specifically, a swing door. A spring is configured to bias the door in a closed position and is pivotally mounted in an offset position to facilitate servicing.

BACKGROUND

Various operators for automatically opening and/or closing doors are known, particularly with respect to swing doors which swing open by pivoting around hinges mounted to a door frame. Such operators may use an electric motor, for example, to open and close the door by rotating a spindle which is connected to an arm that is, in turn, connected to the door. Rotating the spindle causes displacement of the arm which causes the door to transition between open and closed or vice versa. Some operators use a powered mechanism for opening the door such as a motor, and may use a non-powered mechanism for closing the door such as a spring which biases the door toward the closed position.

In known operators which utilize a spring, the spring is typically positioned within a series of gears, spindles, levers, and other internal components, making the spring difficult to access in the event repair or replacement of the spring becomes necessary. Often, substantial disassembly of the operator is required which can be costly and time-consuming.

Moreover, a variety of factors associated with an installation configuration of a door operator may impact the functionality of the spring. For example, the weight of the door, the length of the arm, the location in which the arm is mounted to the door, the location at which the operator is mounted to the door frame, etc., can all affect the forces exerted on and by the spring. However, many existing door operators do not provide a means for adjusting properties of the spring to account for the installation configuration.

A need accordingly exists for a swing door operator that addresses one or more shortcomings of conventional swing door operators. Some swing door operators described herein may include a spring that can be easily accessed, replaced, and/or adjusted.

SUMMARY

The present disclosure is directed to a swing door operator that may address one or more of the challenges described herein. Some implementations may include a pivotally mounted spring that may be adjustably pre-compressed or pre-tensioned and that may be easily replaced with minimal disassembly of the operator.

According to some exemplary aspects, the present disclosure is directed to a swing door operator that may include a spindle, a drive unit operatively coupled to the spindle, a powered driver operatively coupled to the drive unit, a spring, and a spring mount. The powered driver may be operable to move the drive unit to rotate the spindle in a first direction. The spring mount may be engaged with a first end of the spring and may be pivotally connected to the drive unit. The spring mount may be pivotable between: an operating configuration in which the spring is arranged to be compressed by the drive unit as the spindle rotates in the first direction and to expand thereafter to rotate the spindle in a second direction opposite the first direction; and a servicing configuration in which the spring is slidably removable from the spring mount.

In some implementations, a swing door operator may further include a fastener configured to secure a second end of the spring to retain the spring mount in the operating configuration. The fastener may be further configured to adjustably pre-compress the spring by advancing or retracting the fastener with respect to the bracket. Pre-compression in the spring may ensure the door is fully closed after the driver shuts off and may also bias the door toward the closed position to ensure it remains shut until the driver is actuated.

In some implementations, a swing door operator may also include a mounting plate affixed to the second end of the spring and a bracket. The fastener may extend through the bracket and may be threadedly engaged with the bracket to push the second end of the spring as the fastener is advanced through the bracket to pre-compress the spring.

In some implementations, a swing door operator may include a telescoping shaft extending through a central lumen of the spring between the spring mount and the mounting plate. The telescoping shaft may include a first shaft member and a second shaft member. The first shaft member may extend from the spring mount and the second shaft member may extend from the mounting plate. An outer diameter of one of the first shaft member or the second shaft member may be larger than an inner diameter of the other of the first shaft member or the second shaft member to facilitate sliding engagement.

In some implementations, the drive unit may include at least one gear operably coupling the driver to the spindle and a lever operably coupled to the at least one gear. The spring mount may be pivotally connected to the lever. The lever may be configured to compress the spring against the fastener when the driver moves the drive unit to rotate the spindle in the first direction.

In some implementations, the driver may include an electric motor or a pneumatic or hydraulic piston.

In another aspect of the present disclosure, a system may include a door and a swing door operator. The swing door operator may include a spindle, a drive unit operatively coupled to the spindle, a powered driver operatively coupled to the drive unit, a spring, and a spring mount. The driver may be operable to move the drive unit to rotate the spindle in a first direction. The spring mount may be engaged with a first end of the spring and being pivotally connected to the drive unit. The spring mount may be pivotable between: an operating configuration in which the spring is arranged to be compressed by the drive unit as spindle rotates in the first direction and to expand thereafter to rotate the spindle in a second direction opposite the first direction; and a servicing configuration in which the spring is slidably removable from the spring mount.

In some implementations, a system may further include one or more of a swing arm coupling the spindle and the door, a frame hingedly coupled to the door and supporting the swing door operator, a track mounted to the door and slidably supporting an end of the swing arm, or a bracket mounted to the door and pivotally supporting an end of the swing arm.

In another aspect of the present disclosure, a method for replacing a spring in a swing door operator may include releasing a first end of a first spring; pivoting the first end about a spring mount supporting a second end of the first spring; and sliding the first spring away from the spring mount in a direction extending from the second end toward the first end.

In some implementations, the releasing may include retracting a fastener through a bracket and away from the first spring. The fastener may be engaged with a mounting plate affixed to the second end of the first spring prior to the retracting.

In some implementations, a telescoping shaft may extend through the first spring. The sliding may include separating a first shaft member of the telescoping shaft from a second shaft member of the telescoping shaft.

In some implementations, the pivoting may swing the first spring away from a drive unit of the swing door operator.

In some implementations, a method may further include: engaging a second end of a second spring with the spring mount; pivoting a first end of the second spring about the spring mount; and securing the first end of the second spring to the bracket.

In some implementations, the second spring may have a spring constant that is different than a spring constant of the first spring.

In another aspect of the present disclosure, a swing door operator includes a housing, a drive unit, a powered driver, a spring, and a spring mount. The housing may include a top, a bottom, an outward facing side and an inward facing side. The inward facing side may be configured to face a wall or door structure when installed for use. The outward facing side may be configured to face away from the wall or door structure when installed for use. The housing may have a longitudinal axis. The drive unit may be disposed in the housing and at least partially disposed adjacent the inward facing side of the housing.

The powered driver may be carried by the housing and operatively coupled to the drive unit and may also be operable to move the drive unit to rotate the spindle in a first direction. The spring may be offset from a central portion of the housing and disposed adjacent the outer facing side when the housing is installed for use. The spring mount may support the spring and be displaceable relative to the housing to move the spring between an operating position substantially parallel to the longitudinal axis of the housing and a servicing configuration in which the spring is angled relative to the longitudinal axis of the housing.

In some implementations, a swing door operator may also include a removeable housing cover sized and shaped to cover the spring. A portion of the drive unit may be disposed between the spring and the inward facing side of the housing.

In some implementations, a swing door operator may include a swing arm extending between the spindle and the other of the wall or door structure.

It is to be understood that both the foregoing general description and the following drawings and detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following. One or more features of any embodiment or aspect may be combinable with one or more features of other embodiment or aspect.

BRIEF DESCRIPTION OF THE DRAWINGS

The accompanying drawings illustrate implementations of the systems, devices, and methods disclosed herein and together with the description, serve to explain the principles of the present disclosure.

Figure 1:
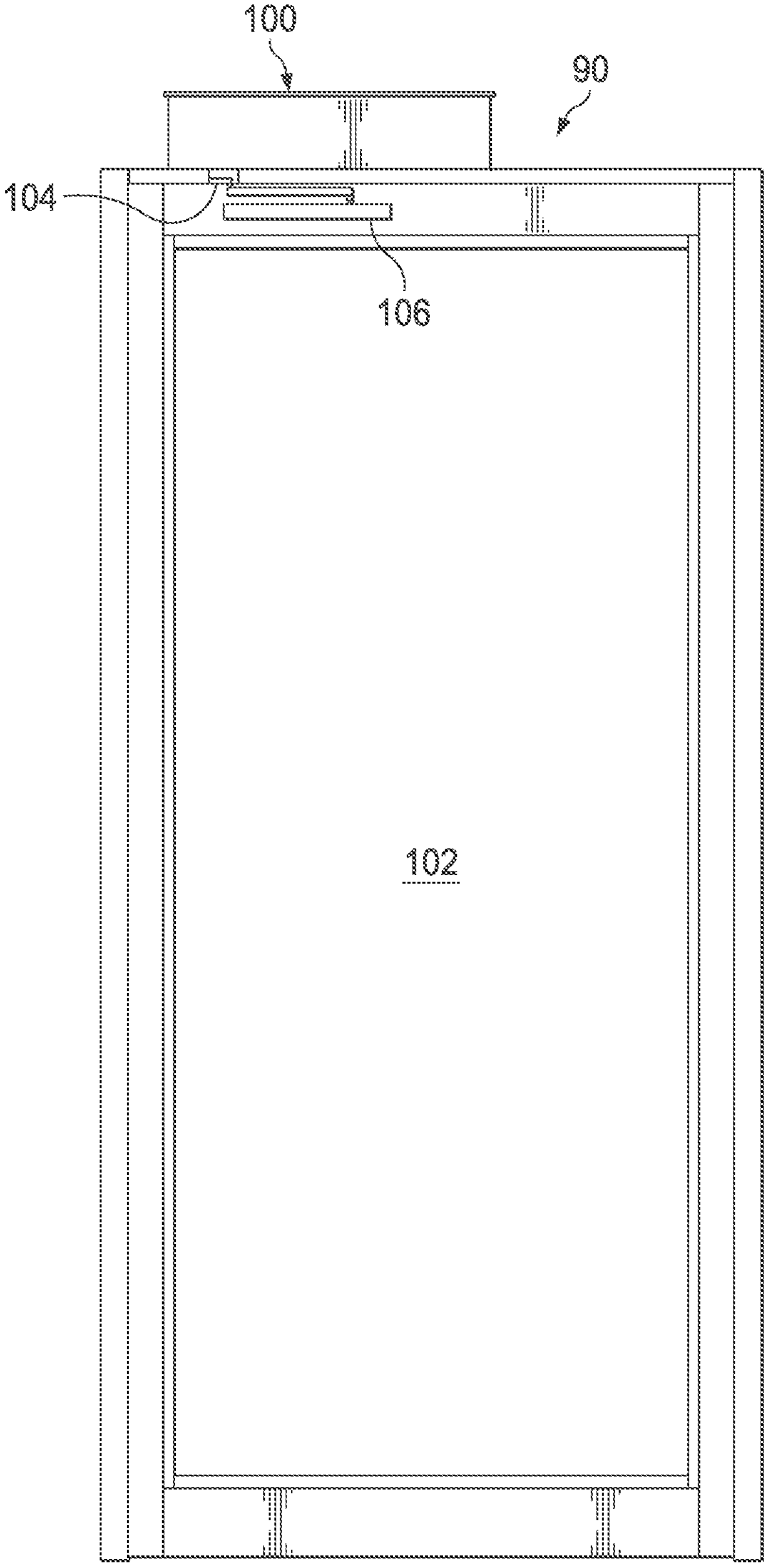
FIG. 1 is a front view of an embodiment of a system including a swing door operator according to an example implementation of the present disclosure.

These Figures will be better understood by reference to the following Detailed Description.

DETAILED DESCRIPTION

For the purpose of promoting an understanding of the principles of the present disclosure, reference will now be made to the implementations illustrated in the drawings and specific language will be used to describe them. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In addition, this disclosure describes some elements or features in detail with respect to one or more implementations or Figures, when those same elements or features appear in subsequent Figures, without such a high level of detail. It is fully contemplated that the features, components, and/or steps described with respect to one or more implementations or Figures may be combined with the features, components, and/or steps described with respect to other implementations or Figures of the present disclosure. For simplicity, in some instances the same or similar reference numbers are used throughout the drawings to refer to the same or like parts.

The present disclosure is directed to a swing door operator that includes a removable housing and a spring disposed in an offset position with respect to a drive unit and pivotally mounted on one end. This configuration of the spring allows for ease of access and removal without complicated disassembly of the drive unit.

Figure 2:
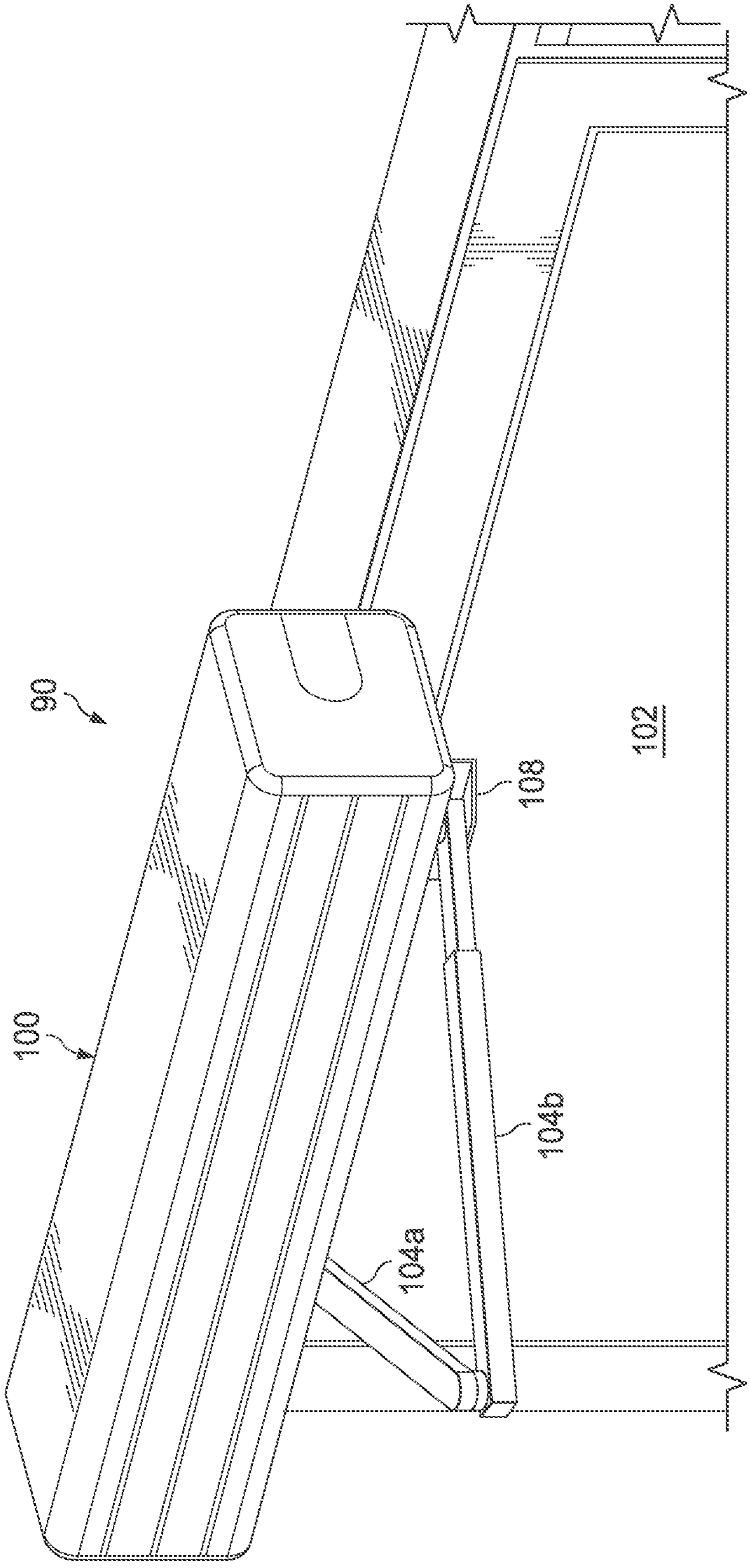
FIG. 2 is a perspective view of the system of FIG. 1.
Figure 3:
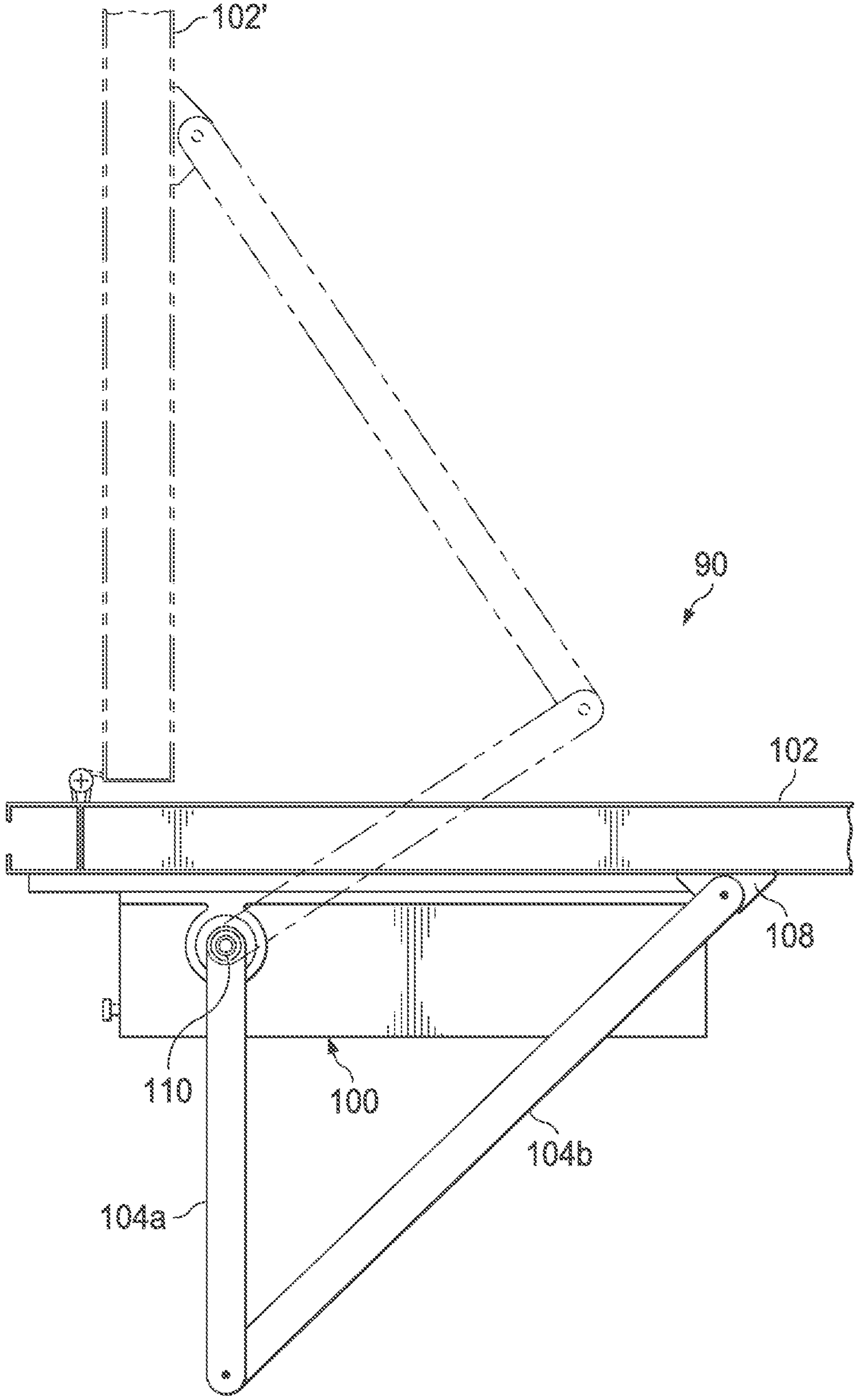
FIG. 3 is a top view of the system of FIG. 1, showing the door in an open configuration and a closed configuration.

FIGS. 1-3 illustrate an embodiment of a system 90 which includes a swing door operator 100 and a door 102 according to the present disclosure. Swing door operator 100 is typically mounted above the door 102. For example, it may be mounted to the door frame, to a header above the door frame, to a wall above the door frame, or even within a wall. It is also contemplated that a swing door operator may be positioned along a side of or adjacent to a door. A swing arm 104 may form a part of the swing door operator 100 or may be configured to cooperate with the swing door operator 100. Swing arm 104 is attached to the swing door operator 100 at one end and is attached to the door 102 at the other end. Depending on the implementation, the swing arm 104 may include a single member or link or may be comprised of a plurality of members or links. In the embodiment illustrated in FIG. 1, the swing arm 104 is attached to the door 102 via a track 106. The track 106 also may form a part of the swing door operator 100 or may be separate from the swing door operator 100. An end of the swing arm 104 may slide along the track 106 as the door 102 opens and closes.

In FIG. 2, it can be seen that swing arm 104 in this implementation comprises first arm member 104*a* and second arm member 104*b* which are pivotally connected at a joint. In this illustration, second arm member 104*b* is attached to the door via a bracket 108, in lieu of a track, and pivots with respect thereto as the door 102 opens and closes. The swing arm 104 connects to the swing door operator at a spindle 110. An example spindle is described below with reference to FIGS. 4-8.

FIG. 3 illustrates how the first arm member 104*a* and second arm member 104*b* interact to transition from a closed configuration of the door 102 to an open configuration of the door 102' as spindle 110 rotates the first arm member 104*a*.

Figure 4:
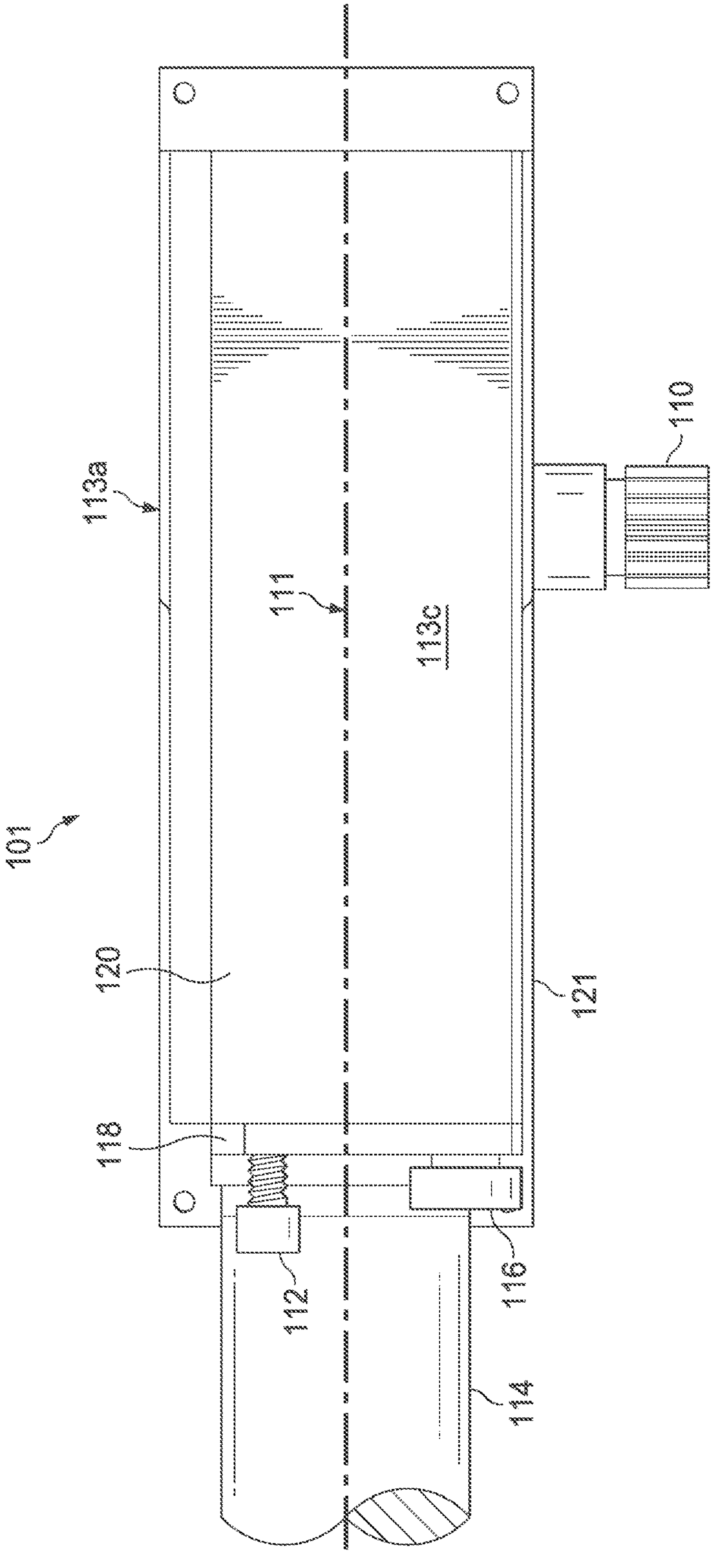
FIG. 4 is a side view of an embodiment of a swing door operator according to an example implementation of the present disclosure.

FIGS. 4-8 illustrate an embodiment of a swing door operator 101 according to the present disclosure. As shown in FIG. 4, spindle 110 may have a notched or toothed surface that interfaces with a corresponding surface of first arm member 104*a*. Alternatively, first arm member 104*a* may be permanently attached to spindle 110 or may be screwed or otherwise fastened thereto. A fastener 112 may extend through a bracket 118 to engage a spring or mounting plate within the housing 121, as discussed below. The bracket 118 may define a portion of the housing 121 of the swing door operator 101 or may be concealed within the housing 121 by a housing cover 120.

Housing cover 120 may be secured to the swing door operator 101 with fastener 116. A knob of fastener 116 may be rotated to remove fastener 116 from bracket 118 to unsecure an end of the housing cover 120, allowing it to be opened to expose the drive unit (not shown). For example, the housing cover 120 may be completely removable after the fastener 116 is retracted therefrom or it may be secured to the swing door operator 101 at an opposing end and may pivot with respect thereto via a hinge, tether, or other mechanism. It should be appreciated that fastener 116 may be disposed at any location around the housing cover 120, or an alternatively means of retaining the housing cover 120 in a closed position may be used, for example, a snap fit or a latch.

A housing 121 of swing door operator 101 may have a top side 113*a*, a bottom side 113*b*, an outward facing side 113*c*, and an inward facing side 113*d*. The inward facing side 113*d* may be configured to face a wall, door, or other structure when installed for use. The outward facing side 113*c* may be configured to face away from the wall, door, or other structure when installed for use. The housing may have a longitudinal axis 111 along its length. The drive unit 122 may be at least partially disposed adjacent the inward facing side 113*d*. The spring 130 may be offset from a central portion of the housing near the longitudinal axis 111 and may be disposed adjacent the outer facing side 113*c*. This arrangement may facilitate access to the spring 130 when the swing door operator 101 is installed. For example, the housing cover 120 may be swung open or removed and the spring 130 may be accessible without disassembly of or interference from the drive unit 122. The spring 130 may be substantially parallel to the longitudinal axis 111 when in an operating configuration and may be angled with respect to the longitudinal axis 111 when in a servicing configuration.

As illustrated, powered driver 114 may extend from an end of the housing. Alternatively, the driver 114 may be concealed within the housing and may be disposed in any orientation or arrangement which facilitates powering the drive unit with the driver 114. Although illustrated as an electric motor, driver 114 may comprise any suitable mechanism for powering the drive unit, such as a pneumatic or hydraulic piston.

Figure 5:
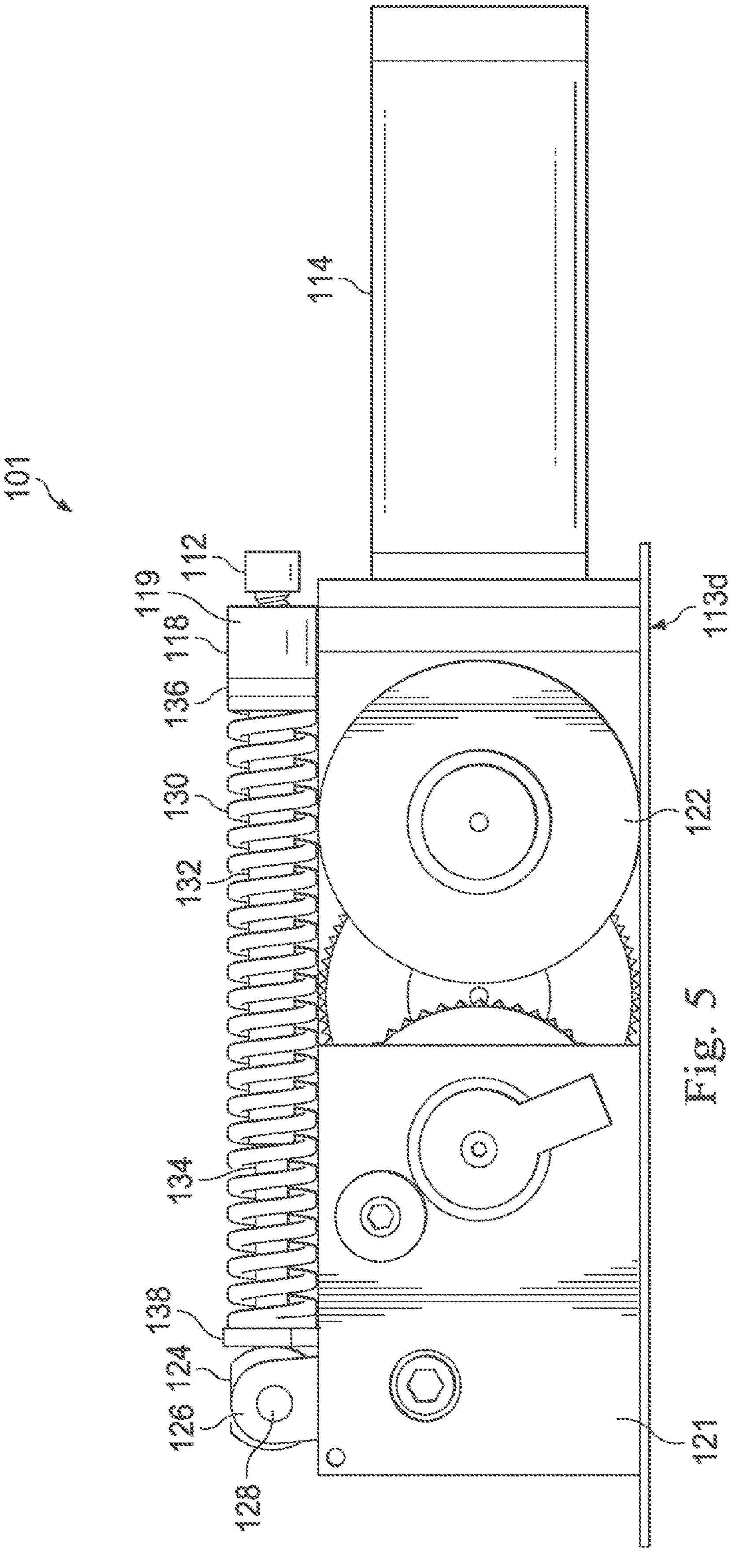
FIG. 5 is a top view of the swing door operator of FIG. 4 with the housing cover removed.
Figure 6:
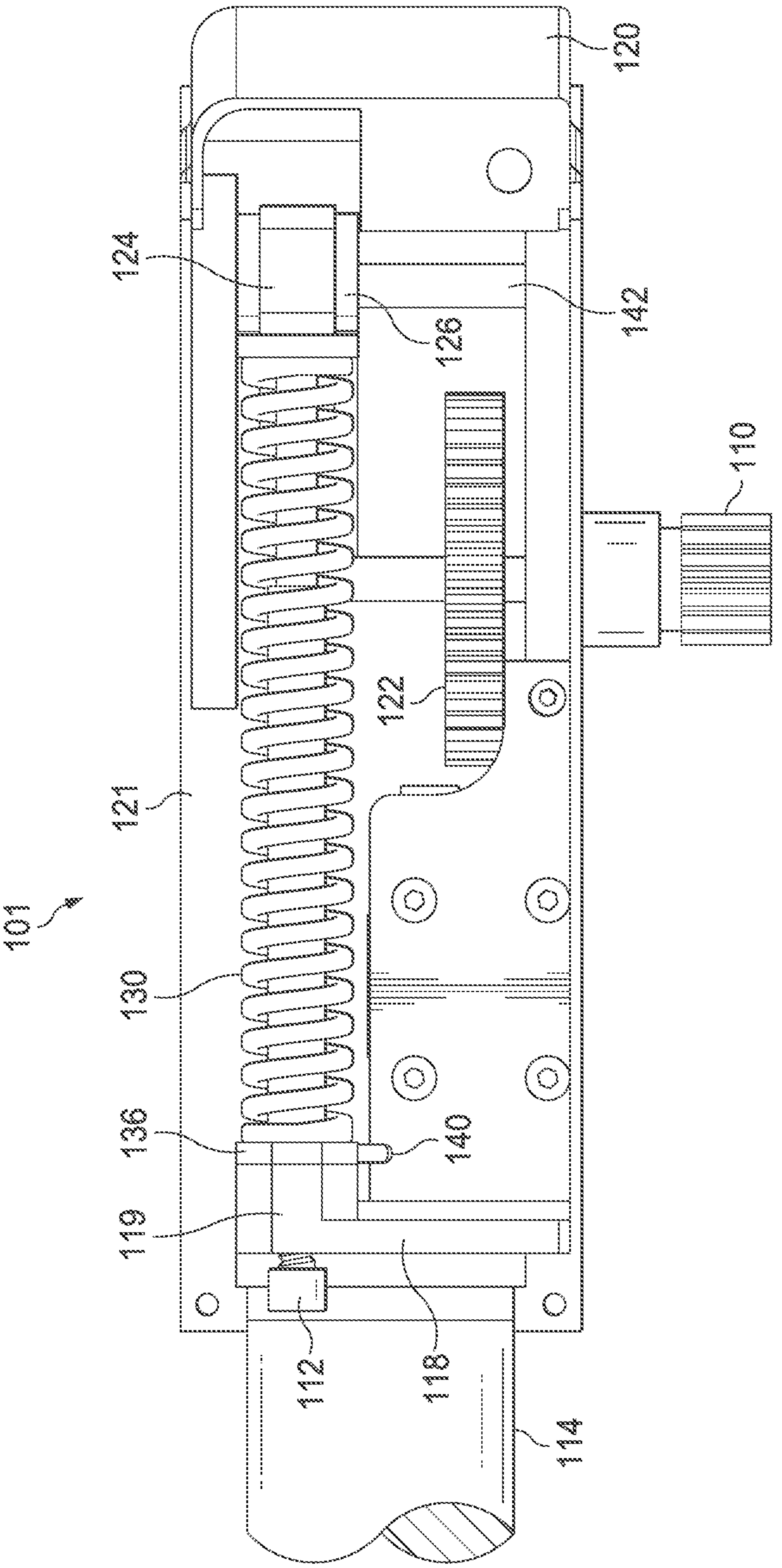
FIG. 6 is a side view of the swing door operator of FIG. 4 with the housing cover opened.

Turning to FIGS. 5-6, swing door operator 101 is illustrated in an operating configuration. Spring 130 is disposed between mounting plate 138 on a first end and mounting plate 136 on a second end. One or both of the mounting plates 136, 138 may be affixed to the spring 130. In the illustrated embodiment, mounting plate 138 is affixed to spring mount 124.

A telescoping shaft extends through a central lumen of the spring 130. The telescoping shaft includes a first shaft member 132 and a second shaft member 134. An outer diameter of one of the first shaft member 132 and second shaft member 134 may be slightly less than an inner diameter of the other. This configuration allows for telescoping movement of the first shaft member 132 with respect to the second shaft member 134 as the spring 130 compresses and expands. The rigidity of the telescoping shaft, as provided by a tight fit between overlapping portions of the first shaft member 132 and second shaft member 134, may provide lateral support to prevent the spring 130 from bowing or flexing laterally and may constrain movement of the spring 130 to compression and expansion along its longitudinal axis. In some embodiments, the telescoping shaft may be a gas-filled piston with a seal to provide buffering as the spring 130 compresses and/or expands. In the illustrated embodiment, mounting plate 136 is affixed to the first shaft member 132.

Fastener 112 may be threadedly engaged with the bracket 118 to advance or retract with respect thereto. A head of the fastener 112 may be rotated by hand or by a tool (e.g., screwdriver or hex key) inserted into a tool engagement feature (e.g., recess). An end of the fastener 112 opposite the head may engage mounting plate 136. In this regard, as the fastener is advanced through the bracket 118, it may push the mounting plate away from the bracket 118 and increase a pre-compression force in the spring 130. Similarly, retracting the fastener 112 may allow the spring 130 to expand and push the mounting plate 136 toward the bracket, thereby reducing pre-compression.

It can be seen that bracket 118 includes a tubular member 119 through which fastener 112 extends. An inner wall 117 (FIG. 9) of the tubular member 119 may correspond to an outer size and shape of mounting plate 136 to permit the mounting plate 136 to advance into a side of the tubular member 119 opposite the head of the fastener 112. In this regard, when some or all of the pre-compression force has been removed from the spring 130, and the spring 130 is in a semi-relaxed or relaxed configuration, respectively, the mounting plate 136 may be disposed within the tubular member 119 of the bracket 118. The corresponding shapes of the mounting plate 136 and bracket 118 may allow bracket 118 to provide lateral support to the mounting plate 136 to prevent the spring 130 from unintentionally pivoting outward as the fastener 112 is retracted. In some embodiments, the tubular member 119 may be omitted from the bracket 118.

When the fastener 112 is retracted from the mounting plate 136, the second end of the spring 130 may be free to pivot away from the drive unit 122 of the swing door operator 101 as the spring mount 124 at the first end pivots around a pivot point defined by pin 128 extending through the spring mount 124 and a lever 126. Releasing the spring 130 to enable pivoting of the spring mount 124 may require a user to manually compress the spring 130 to free the mounting plate 136 from the tubular member 119 of the bracket 118.

As can be partially seen in FIG. 5, drive unit 122 may comprise a plurality of drive components including, but not limited to, gears, axles, rotors, levers, arms, etc. The present disclosure contemplates that any appropriate combination and arrangement of drive components may utilized in drive unit 122 to facilitate rotation of the spindle 110 using driver 114. In the illustrated embodiment in which driver 114 comprises an electric motor, rotation of a shaft of the motor along a horizontal axis may be translated into rotation of the spindle 110 around a vertical axis by drive unit 122. Appropriate gear ratios may be used to provide a differentiation in rotation speed and torque at the spindle 110 in comparison to the shaft of the motor.

FIG. 6 provides another perspective of the tubular member 119 of the bracket 118. It can be seen that the tubular member 119 and mounting plate 136 each have at least one flat, or otherwise non-circular, surface which may prevent rotation of the mounting plate 136 with respect to the bracket 118. Tab 140 may extend from the mounting plate 136 to further aid in preventing rotation of the mounting plate 136, even when the fastener 112 has pushed the mounting plate 136 outside of tubular member 119 (e.g., high pre-compression). Tab 140 may slide along bracket 118, a plate, rail, or other feature of the drive unit 122 as the fastener 112 is retracted or advanced. Tubular member 119 may include a slot (not shown) to receive tab 140 as the fastener 112 is retracted.

Pin 142 may extend transversely with respect the longitudinal axis of the spring 130 and may define a pivot axis of lever 126 to which spring mount 124 is pivotally attached, as described below.

Figure 7:
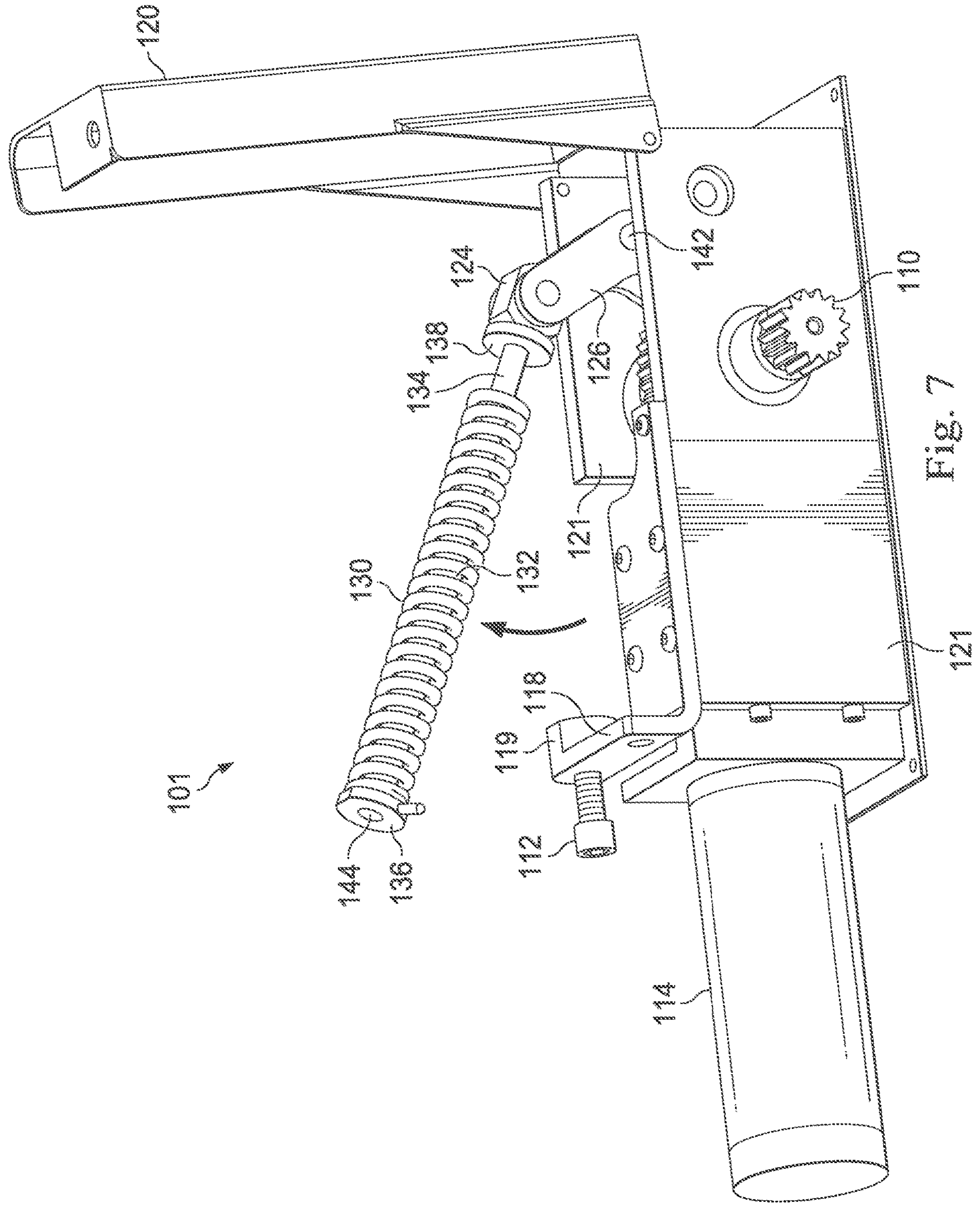
FIG. 7 is a perspective view of the swing door operator of FIG. 4 with the housing cover opened and the spring partially removed.

Turning to FIG. 7, swing door operator 101 is illustrated in a servicing configuration in which the spring 130 can be removed. Spring 130 is shown sliding away from spring mount 124 and mounting plate 138 as the telescoping is shaft is extended and pulled apart.

As can be seen in FIG. 7, mounting plate 136 may include a recess 144 for receiving the fastener 112. The recess 144 may extend only partially through the mounting plate 136 or may be tapered to a diameter smaller than a diameter of the shaft of the fastener 112 to prevent the fastener 112 from sliding freely through the mounting plate 136.

In alternative embodiments of a swing door operator, a spring may be configured for tension rather than compression. In such an embodiment, spring 130 may be secured to mounting plate 138 and spring mount 124 and a threaded aperture may be provided in lieu of recess 144. In this regard, the fastener may engage the aperture to pull the mounting plate 136 and thereby stretch the spring.

Figure 8:
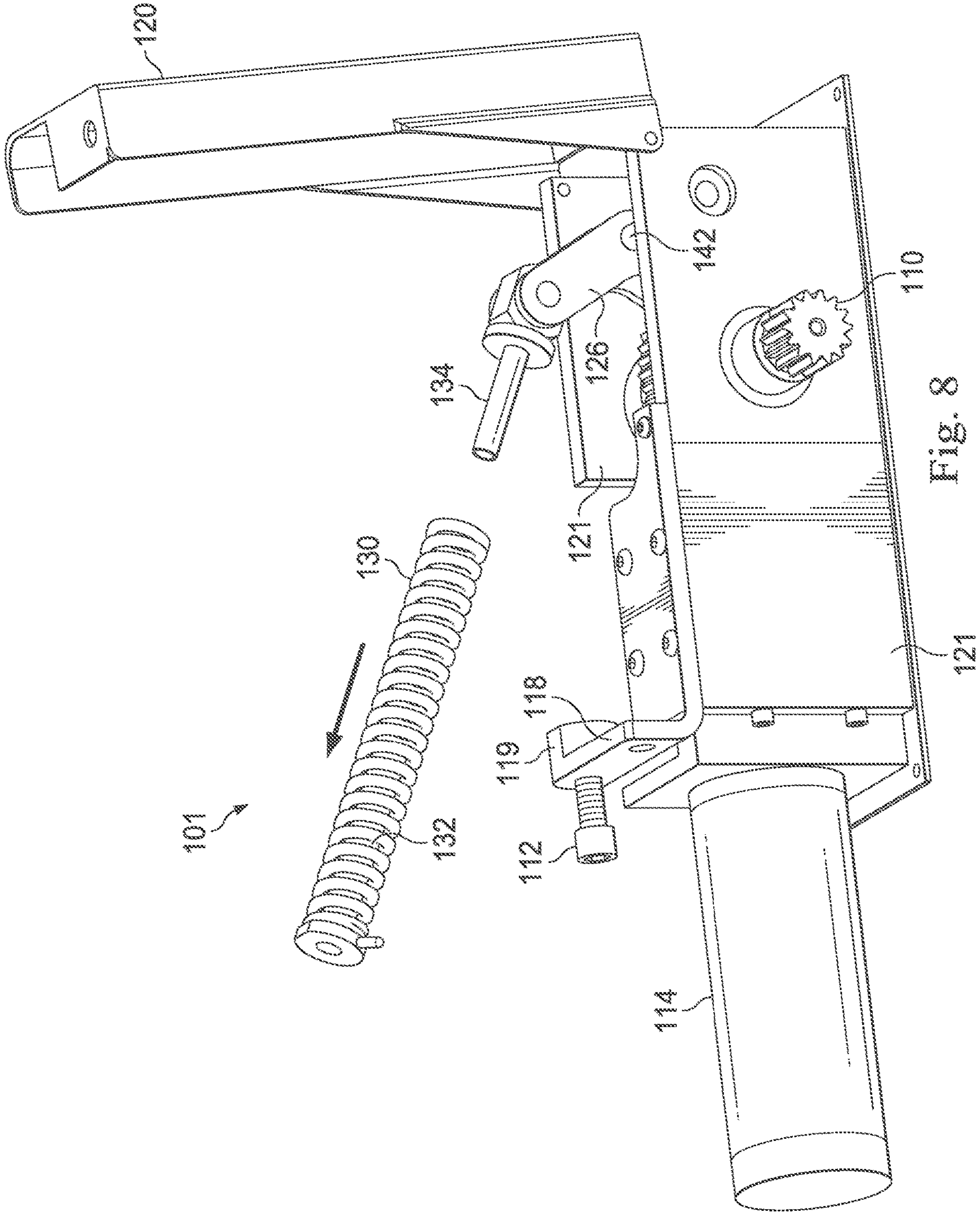
FIG. 8 is a perspective view of the swing door operator of FIG. 4 with the housing cover opened and the spring removed.

FIG. 8 shows the swing door operator 101 with the spring 130 fully removed. In this configuration, the spring 130 may be replaced with a different spring. For example, if spring 130 is damaged or worn, it may be easily replaced with a similar spring by opening the housing cover 120, retracting fastener 112, and pivoting the spring mount 124 outward. Alternatively, it may be desirable to replace spring 130 with a spring having at least one property different than that of spring 130 to customize swing door operator 101 for a particular installation configuration. For example, a spring having a different coil spacing, length, or spring constant may be desired. In this regard, swing door operator 101 may be provided in a kit including a plurality of interchangeable springs to accommodate a variety of installation configurations.

Figure 9:
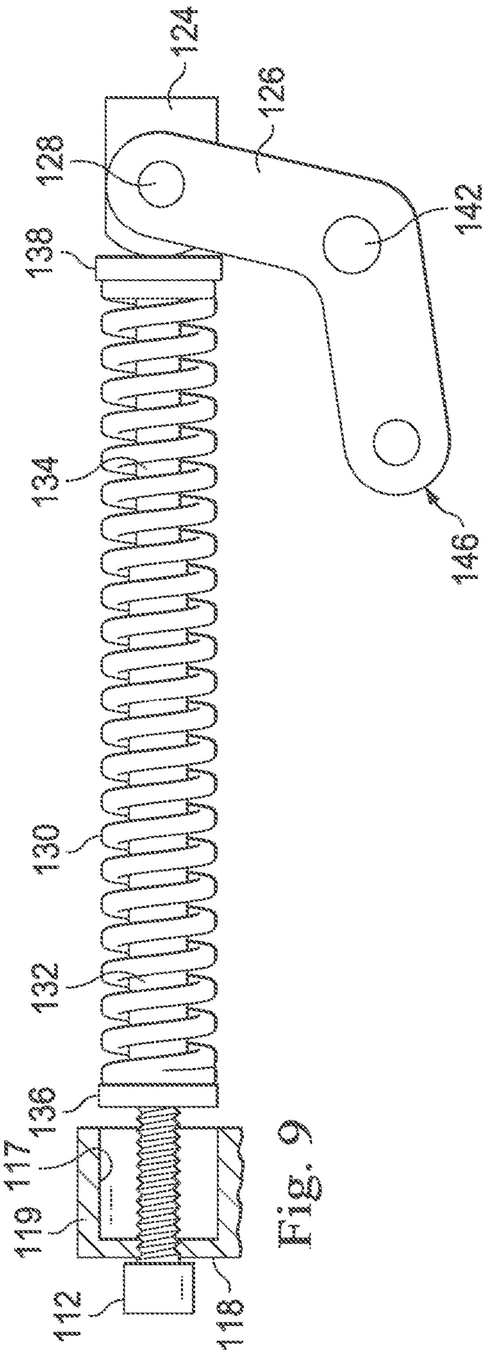
FIG. 9 illustrates a lever and spring in a pre-compressed configuration according to an example implementation of a swing door operator of the present disclosure.

FIG. 9 illustrates a lever 126 and spring 130 in a pre-compressed configuration. Many features of the swing door operator have been omitted to provide an unobstructed view of the illustrated components. In this configuration, the fastener 112 has been advanced through the bracket 118 such that the mounting plate 136 has been pushed out of tubular member 136. Mounting plate 136 may be stabilized laterally by the seating of the end of the fastener 112 into the recess of the mounting plate 136 (e.g., recess 144 shown in FIG. 7). The configuration shown in FIG. 9 is associated with a closed door. The lever 126, which pivots around pin 142, is in a position at which the spring mount 124 is retracted to its maximum extent and the spring is pre-compressed between the mounting plates 136, 138.

Figure 10:
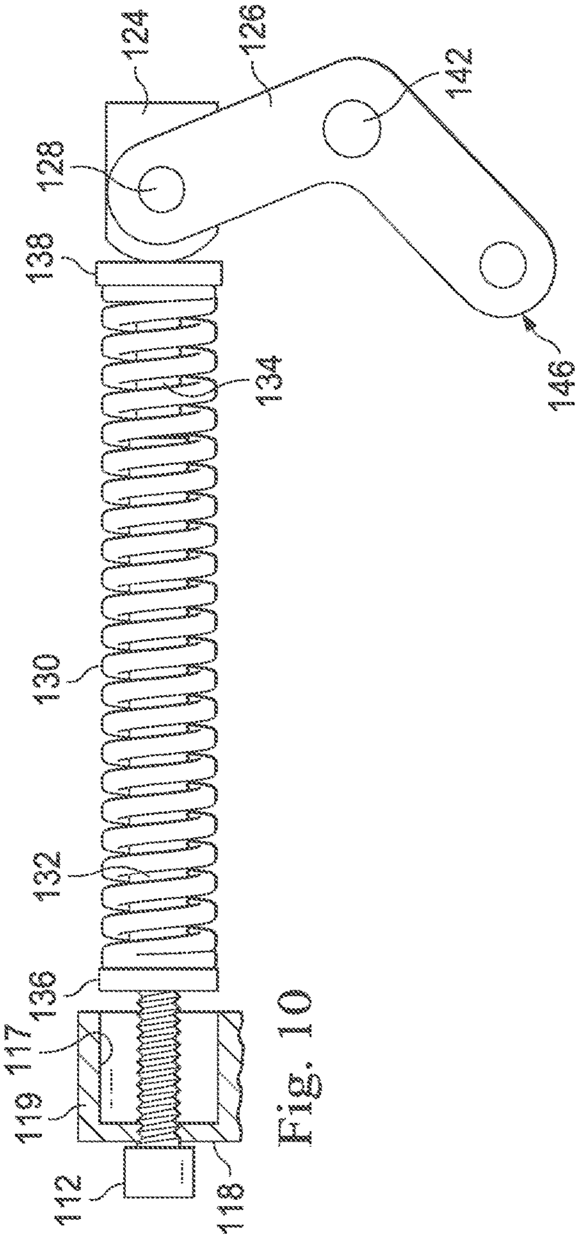
FIG. 10 illustrates the lever and spring of FIG. 9 in a compressed configuration.

FIG. 10 illustrates the lever 126 and spring 130 of FIG. 9 in a compressed configuration associated with an open or partially open door. The lever is typically an L-shaped member having a pivot point disposed near an elbow between a first end and an opposing second end. As the driver 114 powers the drive unit 122, the drive unit 122 engages the lever end 146 to pivot the lever 126 around pin 142 while simultaneously rotating the spindle 110 in a first direction to open the door. Rotational movement of the lever 126 is translated into axial movement of the spring mount 124 as it pivots about pin 128 and compresses the spring 130. As the spring 130 is compressed, the second shaft member 134 of the telescoping shaft may slide further into hollow core of the first shaft member 132. In alternative embodiments, the lever may be formed without an elbow, e.g. as a straight member, or with multiple elbows to accommodate geometrical constraints within the housing 121 and drive unit 122.

When the driver 114 is powered off, disengaged from the drive unit 122, or otherwise ceases powering the drive unit 122, the potential energy stored in the compressed spring 130 is converted into kinetic energy as the spring 130 expands, pushes the spring mount 124, and in turn, rotates the lever 126 about pin 142. Rotation of the lever 126 about the pin 142 as the spring 130 expands operates the drive unit 122 in a direction opposite to that caused by the driver 114, thereby rotating the spindle 110 in a second direction associated with closing the door as the lever 126 returns to the configuration shown in FIG. 9.

Figure 11:
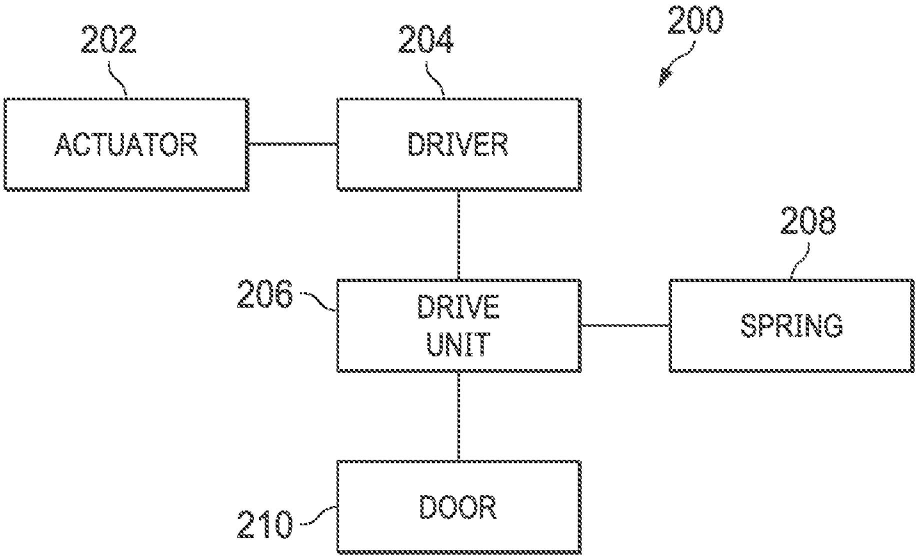
FIG. 11 provides a schematic illustration of an embodiment of a system for opening a door according to an example implementation of the present disclosure.

FIG. 11 provides a schematic illustration of an embodiment of a system 200 for opening a door according to the present disclosure. Actuator 202 may be any suitable device for initiating operation of a swing door operator. Some examples of contemplated actuators include a motion sensor, pressure-activated pad, camera, door-handle, button, remote control, voice-recognition module, RFID reader, keypad, etc. Actuator 202 may transmit an open instruction to a controller associated with driver 204, thereby causing driver 204 to operate to power the drive unit 206. The drive unit 206 is operatively connected to both a spring 208 and a door 210. As the drive unit 206 opens the door via powered operation of the driver 204, the drive unit 206 also compresses the spring 208. When the controller instructs the driver 204 to shut-off or disengage from the drive unit 206, the spring 208 expands. Expansion of the spring 208 operates the drive unit 206 in reverse operating mode to swing the door 210 closed. Spring 208 may be pivotably mounted to the drive unit 206 to facilitate servicing.

Figure 12:
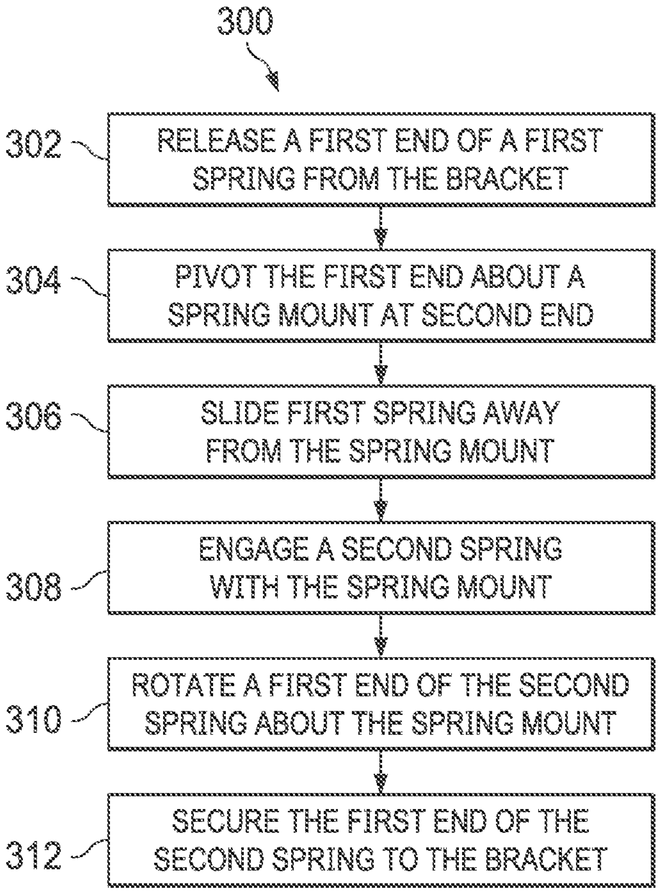
FIG. 12 is a flowchart of a method for replacing a spring in a swing door operator according to an example implementation of the present disclosure.

FIG. 12 is a flowchart of a method 300 for replacing a spring in a swing door operator according to an embodiment of the present disclosure. The method 300 includes a process 302 of releasing a first end of a first spring from a bracket. This may include retracting a fastener away from a mounting plate engaged with the spring to release a pre-compression force in the spring. Process 304 includes pivoting the first end of the spring about a spring mount engaged with a second end of the spring. Once the spring is pivoted away from the bracket, process 306 includes sliding the first spring away from the spring mount. This may include detaching a telescoping shaft that extends through the spring. Process 308 includes engaging a second spring with the spring mount, such as by reassembling the telescoping shaft and sliding the second spring toward the spring mount along a shaft member of the telescoping shaft. Then, process 310 includes rotating a first end of the second spring about the spring mount, or more specifically, rotating the spring mount about a pin, axle, or bearing to which the spring mount is secured. The method may also include at process 312 securing the first end of the second spring to the bracket. For example, the fastener may be advanced through the bracket and into engagement with a mounting plate engaged with the second spring. The mounting plate may be permanently attached to the second spring or may be pulled off of the first spring and placed onto the second spring. Optionally, the fastener may be adjusted to a desired position with respect to the bracket to provide an appropriate amount of pre-compression in the spring.

It should be appreciated that the offset mounting position of the spring, in accordance with the present disclosure, provides for ease of access in comparison to known door operators. Moreover, the pivotable attachment of the spring provides for simplified removable with, in some embodiments, only a single fastener needing to be removed to service the spring. The fastener may also, in addition to securing the spring, provide for applying and adjusting a pre-compression force in the spring to provide a selectable degree of biasing of the operator toward a closed-door configuration.

Persons of ordinary skill in the art will appreciate that the implementations encompassed by the present disclosure are not limited to the particular exemplary implementations described above. In that regard, although illustrative implementations have been shown and described, a wide range of modification, change, combination, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A method for replacing a spring in a swing door operator, comprising:
releasing a first end of the spring;
pivoting the first end with respect to a housing about a spring mount supporting a second end of the spring, wherein the housing encloses drive components of the swing door operator when in an operational configuration; and
sliding the spring away from the spring mount in a direction extending from the second end toward the first end.

2. The method of claim 1, wherein a telescoping shaft extends through the spring and the sliding comprises separating a first shaft member of the telescoping shaft from a second shaft member of the telescoping shaft.

3. The method of claim 1, wherein the pivoting swings the spring away from a drive unit of the swing door operator.

4. The method of claim 1, wherein releasing the first end of the spring comprises releasing a pre-compression energy from the spring.

5. The method of claim 1, wherein pivoting the first end about the spring mount comprises rotating the spring about a pin, an axle, or a bearing secured to the spring mount.

6. The method of claim 5, wherein the spring mount is secured to a lever arm by the pin, the axle, or the bearing.

7. The method of claim 1, further comprising:
opening a housing cover of the swing door operator prior to pivoting the first end of the spring.

8. The method of claim 1, wherein the spring is configured to store potential energy during opening of a door and release the potential energy to close the door.

9. A method for replacing a spring in a swing door operator, comprising:
releasing a first end of the spring, wherein the releasing comprises retracting a fastener through a bracket and away from the spring, the fastener being engaged with a mounting plate affixed to the first end of the spring prior to the retracting;
pivoting the first end about a spring mount supporting a second end of the spring; and
sliding the spring away from the spring mount in a direction extending from the second end toward the first end.

10. The method of claim 9, further comprising:
engaging a second end of a second spring with the spring mount;
pivoting a first end of the second spring about the spring mount; and
securing the first end of the second spring to the bracket.

11. The method of claim 10, wherein the second spring has a spring constant that is different than a spring constant of the spring.

12. The method of claim 10, further comprising:
advancing a fastener into engagement with a mounting plate affixed to the first end of the second spring.

13. The method of claim 12, wherein advancing the fastener compresses the second spring to a pre-compressed state.

14. The method of claim 13, wherein the mounting plate comprises a recess and advancing the fastener includes seating an end of the fastener in the recess.

15. The method of claim 10, further comprising:
assembling a first shaft member of a telescoping shaft with a second shaft member of the telescoping shaft, wherein the telescoping shaft extends through the second spring.

16. The method of claim 10, wherein the second spring has a length in a relaxed configuration that is different than a length of the spring in a relaxed configuration.

17. The method of claim 10, wherein the second spring has a coil spacing in a relaxed configuration that is different than a coil spacing of the spring in a relaxed configuration.

18. The method of claim 10, further comprising:

operating a powered driver to pivot a lever arm supporting the spring mount and compress the second spring.

19. A method for replacing a spring in a swing door operator, comprising:

releasing a first end of the spring, wherein the releasing comprises retracting a fastener away from the spring to allow a mounting plate affixed to the first end of the spring to become seated within a recess having an inner wall shaped and sized to laterally constrain the mounting plate with respect to a longitudinal axis of the spring;

pivoting the first end about a spring mount supporting a second end of the spring; and sliding the spring away from the spring mount in a direction extending from the second end toward the first end.

20. The method of claim 19, further comprising:

manually compressing the spring to remove the mounting plate from the recess before pivoting the first end about the spring mount.

* * * * *